( 12 ) United States Patent
Samprathi (10) Patent No.: US 8,458,319 B2
(45) Date of Patent: Jun. 4, 2013

(54) SYSTEM AND METHOD FOR TRACKING NETWORK RESOURCES

(75) Inventor: Ravikanth Samprathi, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 845 days.

(21) Appl. No.: 11/330,947

(22) Filed: Jan. 11, 2006

(65) Prior Publication Data

US 2007/0162595 A1    Jul. 12, 2007

(51) Int. Cl.
*G06F 11/00*    (2006.01)
(52) U.S. Cl.
USPC ........... 709/224; 370/355; 370/413; 370/241; 709/203; 709/225; 709/235; 709/241
(58) Field of Classification Search
USPC ........................................................ 709/223
See application file for complete search history.

(56) References Cited

U.S. PATENT DOCUMENTS

| | | | |
|---|---|---|---|
| 5,130,987 A * | 7/1992 | Flammer | 370/436 |
| 6,564,341 B1 * | 5/2003 | Sundaram et al. | 714/43 |
| 6,735,198 B1 * | 5/2004 | Edsall et al. | 370/389 |
| 7,159,035 B2 * | 1/2007 | Garcia-Luna-Aceves et al. | 709/241 |
| 7,193,994 B1 * | 3/2007 | Payson | 370/380 |
| 2002/0080780 A1 * | 6/2002 | McCormick et al. | 370/355 |
| 2004/0006619 A1 * | 1/2004 | Syed et al. | 709/224 |
| 2004/0236866 A1 * | 11/2004 | Dugatkin et al. | 709/235 |

OTHER PUBLICATIONS

Catalyst 3500 Series XL Hardware Installation Guide, Aug. 2003, Cisco Systems, p. 91.*
"MAC Address Tracking", Aquired at: http://www.firerack.com/features/FMS/mac-tracking, 2 pages, copyright 2000-2006.

* cited by examiner

*Primary Examiner* — Ashok Patel
*Assistant Examiner* — Andrew Goldberg
(74) *Attorney, Agent, or Firm* — Fish & Richardson P.C.

(57) ABSTRACT

A system for tracking resource usage in network. In a specific embodiment, the system includes a memory in a distributed-forwarding switch that maintains resource evolution information. A module, which communicates with the memory, is adapted to update the resource evolution information when the resource changes or information associated with the resource changes. In a more specific embodiment, the memory is implemented via plural resource-tracking hash tables associated with forwarding engines in switches connected to a network. Each hash table communicates with a corresponding resource-tracking module that monitors changes in accompanying forwarding engines and updates the hash tables in response thereto. The resource-tracking modules may also selectively provide information in the resource-tracking modules to a user interface in response to queries or control signals originating from a user interface. The changes in one forwarding engine may propagate to other resource-tracking hash tables associated with other forwarding engines located in a given switch or in different switches across the network.

27 Claims, 5 Drawing Sheets

SYSTEM AND METHOD FOR TRACKING NETWORK RESOURCES

CROSS-REFERENCES TO RELATED APPLICATIONS

This application is related to U.S. patent application Ser. No. 11/043,551 entitled "Method and Apparatus for Tracking Layer-2 (L2) Resource of a Switch", filed on Jan. 26, 2005, which is hereby incorporated by reference as if set forth in full in this application for all purposes.

BACKGROUND OF THE INVENTION

This invention is related in general to networks and more specifically relates to systems and methods for monitoring the behavior of networks and accompanying devices.

Systems for monitoring network behavior are employed in various demanding applications including network-topology troubleshooting, resource distribution and sharing, switch debugging, and bandwidth allocation. Such applications often demand versatile mechanisms that can facilitate rapid network troubleshooting and analysis to ensure optimal network performance.

Systems for monitoring network behavior are particularly important for monitoring network switching devices, which often propagate network changes through certain portions of the network, thereby particularly impacting network behavior. Switching devices include Layer-2 (L2), Layer-3 (L3), and multi-layer switches and routers. These devices are named in accordance with the Open Systems Interconnection (OSI) layer associated with the devices' operations. For example, a layer-2 switch performs various OSI-layer-2 (data layer) functions, such as defining packet sequencing and routing packets based on Media Access Control (MAC) addresses. Similarly, a layer-3 switch performs various functions associated with layer-3 (network layer) of the OSI standard model, which may include implementing various routing protocols. Multi-layer devices may perform functions associated with multiple layers of the OSI standard. A router performs various layer-3 functions, and consequently, is often considered to be a type of layer-3 switch.

Conventionally, when network characteristics, such as topology or traffic patterns, change, certain network resources may be redistributed or otherwise changed by switches in the network. For the purposes of the present discussion, a network resource may be any network entity or characteristic or associated identifier. Examples of network entities include computers, switches, interfaces, and so on. Examples of network characteristics include MAC flow rates, link bandwidth, Transmission Control Protocol (TCP) connection status, and so on. Examples of identifiers include Media Access Control (MAC) addresses associated with modules or other entities connected to the network.

Unfortunately, network administrators often lack sufficient information to accurately determine how network changes are affecting network performance. Consequently, network-problem troubleshooting is often problematic.

To facilitate network troubleshooting, certain debugging utilities installed in a switch or router console may be activated via a Command Line Interface (CLI). Unfortunately, such utilities often lack sufficient information to enable quick resolution of network problems or to enable integration of network resources without creating unforeseen problems.

DETAILED DESCRIPTION OF EMBODIMENTS OF THE INVENTION

A preferred embodiment of the present invention implements a system for tracking resource changes in a switch. In a specific embodiment, the system includes a memory in a distributed-forwarding switch that maintains resource evolution information. A module, which communicates with the memory, updates the resource evolution information when the resource changes or information associated with the resource changes.

In a more specific embodiment, the memory is implemented via plural resource-tracking hash tables associated with forwarding engines in switches connected to a network. Each hash table communicates with a corresponding resource-tracking module that monitors changes in accompanying forwarding engines and updates the hash tables in response thereto. The resource-tracking modules may also selectively forward information maintained in the resource-tracking modules to a user interface in response to queries or control signals originating from a user interface. Changes in resources in one forwarding engine may propagate to other resource-tracking hash tables associated with other forwarding engines located in a given switch or in different switches. The user interface may be employed to access one of the modules to selectively display resource evolution information for one or more forwarding engines in the network. The forwarding engines may be located on a single switch or plural switches in the network.

For clarity, various well-known components, such as power supplies, modems, gateways, firewalls, network cards, Internet Service Providers (ISPs), browsers, standby modules, content switching modules, global site selectors, and so on, have been omitted from the figures. However, those skilled in the art with access to the present teachings will know which components to implement and how to implement them to meet the needs of a given application.

Figure 1:
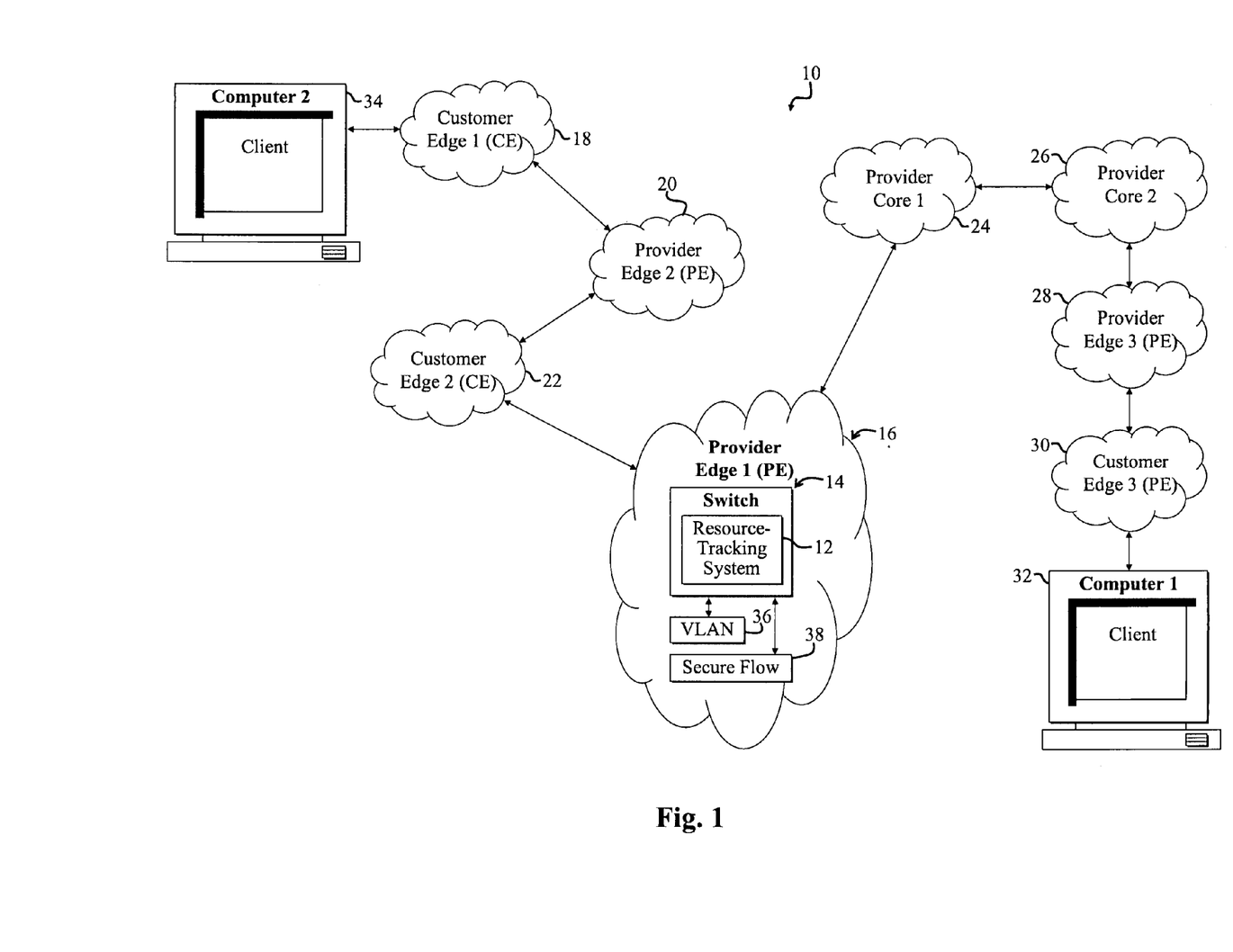
FIG. 1 is a diagram of a network employing a resource-tracking system included in a provider-edge network according to an embodiment of the present invention.

FIG. 1 is a diagram of a network 10 employing a resource-tracking system 12 included in a switch 14 of a first Provider-Edge (PE) network 16 according to an embodiment of the present invention. The exemplary network 10 includes a first Customer Edge (CE) network 18, which is connected to a second PE network 20. The second PE network 20 is connected to a second CE network 22, which is connected to the first PE network 16. The first PE network 16 is also connected to a first provider core network 24. The first provider core network 24 is connected to a second provider core network 26. The second provider core network 26 is connected to a third PE network 28.

For illustrative purposes, the first PE network 16 is shown further including a Virtual Local Area Network (VLAN) 36 and a secure flow 38, which are connected at the switch 14. The third PE network 28 is connected to a third CE network 30, which is connected to a first client computer 32. A second client computer 34 is connected to the first CE network 18. Redundant connections may be included between the various networks 16-30 and between various network entities 16-38 at strategic locations, such as between the provider core networks 24, 26, to enhance network resiliency.

For the purposes of the present discussion, a network resource may be any network entity or characteristic or associated identifier. Examples of network resources include Media Access Control (MAC) addresses, VLAN-MAC-address pairs, and so on.

A network entity may be any node, device, link, or other thing that is connected to a network. Examples of network entities include computers, switches, interfaces, and so on. A network may be any collection of intercommunicating entities.

A network characteristic may be any quality associated with any network entity or function. Examples of network characteristics include MAC flow rates, link bandwidth, Transmission Control Protocol (TCP) connection status, and so on.

Identifiers may be any numbers, addresses, names, or other mechanisms that facilitate identifying a network entity. Examples of identifiers include Media Access Control (MAC) addresses associated with modules or other entities connected to the network.

For the purposes of the present discussion, a switch may be any device, module, software instruction, or other entity that can receive information and forward the information in a predetermined way, such as to a predetermined device address. Examples of switches include L2 switches, L3 switches, and routers.

A distributed-forwarding switch may be a switch that includes plural Forwarding Engines (FEs). An FE may be one or more hardware and/or software modules that are adapted to selectively route data or packets based on address information or other information associated with the data or packets. In a distributed-forwarding switch, various distributed FEs are often governed by a supervisor that includes a centralized FE.

A centralized FE may be a forwarding engine that controls or supervises plural hardware modules that are adapted to selectively routed data or packets. A centralized forwarding engine may be the forwarding engine maintained in a forwarding-engine supervisor of a switch, wherein the forwarding engine supervisor controls or supervises forwarding engines on plural line cards of the switch.

A distributed module may be a module that is functionally and/or physically separate from other similar or related modules. Examples of distributed modules include forwarding engines on a line card, resource-tracking tables on different line cards, resource-tracking tables on different switches, and so on.

Resource evolution information may be any information pertaining to the history of a resource. Examples of resource evolution information include, but are not limited to, information specifying resource creation time, reason for creation of the resource, purpose of the resource, event that triggered resource change or creation, and so on.

In operation, the various networks 16-30 include various switches, such as the PE switch 14, which facilitate selectively transferring messages or packets between various network entities, including the networks 16-30 and accompanying entities, such as the VLAN 36 and the secure flow 38. In the present specific embodiment, the PE switch 14 may act as an L3 switch or router, which may be implemented via a Cisco Catalyst 6K switch, such as a Cisco Catalyst 6500 switch. Furthermore, the PE switch 14 may be implemented via plural dual-homed or multi-homed switches without departing from the scope of the present invention.

As data traffic between the networks 16-30 and other entities 32-38 varies and/or network topology changes, network resources allocated by the switch 14 to handle the varying traffic experienced by the first PE network 16 also varies. For example, MAC addresses, Multi Protocol Label Switching (MPLS) information, peer identification numbers, VLAN Internet Protocol (IP) addresses, MAC-address/VLAN pairs, TCP connection information, and so on, may change.

When the topology of the network 10 changes, such as when new devices are added to or removed from the network 10, various values, i.e., resources, maintained by the switch 14 pertaining to switching operations change. Values required to implement transparent bridging operations, such as distributed forwarding, distributed learning, distributed ether channels, per VLAN learning and aging, may change.

Conventionally, the history associated with a given network resource is not adequately maintained by any entity in the network 10. Consequently, network problem troubleshooting is problematic. For example, if a secure connection between the second CE network 22 and the first PE network 16 breaks or has another problem, current debugging applications often lack sufficient information to readily and quickly determine what caused the problem.

The resource tracking system 12 included in the switch 14 monitors when a change in a given network resource occurs, then logs the change in a memory, such as a hash-table. As discussed more fully below, the hash table is selectively accessible via a switch console that is adapted to accept Command Line Interface (CLI) instructions to facilitate displaying history information pertaining to one or more resources associated with the switch 14 or associated with difference switches that connect to the switch 14. The resource-tracking system 12 can track resource evolution information, such as resource history, resulting from changes in resources at various locations, such as FEs within the switch 14, changes occurring within the first PE network 16, and changes occurring within other switches in the network 10. The resource-tracking system 12 may be employed to aggregate such resource evolution or history information from various entities of the network 10.

For illustrative purposes the resource-tracking system 12 is shown as a single module in FIG. 1. However, in practice, the resource-tracking system 12 includes components that are distributed throughout FEs within the switch 14 as discussed more fully below. Furthermore, the resource-tracking system may include components that are distributed in other switches.

An FE in a switch facilitates routing data, such as packets, based on address information, such as MAC addresses. Various routing or switching methods, such as cut-through, fragment-free, and store-and-forward, may be employed by an FE to facilitate routing without departing from the scope of the present invention.

A change in a resource that occurs in one FE of the switch 14 and propagates to other FEs of the switch 14 is readily tracked by components of the resource-tracking system 12 at the FEs. A master resource-tracking memory, such as a master hash-table included in the resource-tracking system 12 may selectively retrieve updated information pertaining to a given resource from the distributed resource-tracking hash-tables at the FEs as discussed more fully below. Embodiments of the present invention are particularly useful in FEs that employ Encoded Address Recognition Logic (EARL) as discussed more fully below.

Figure 2:
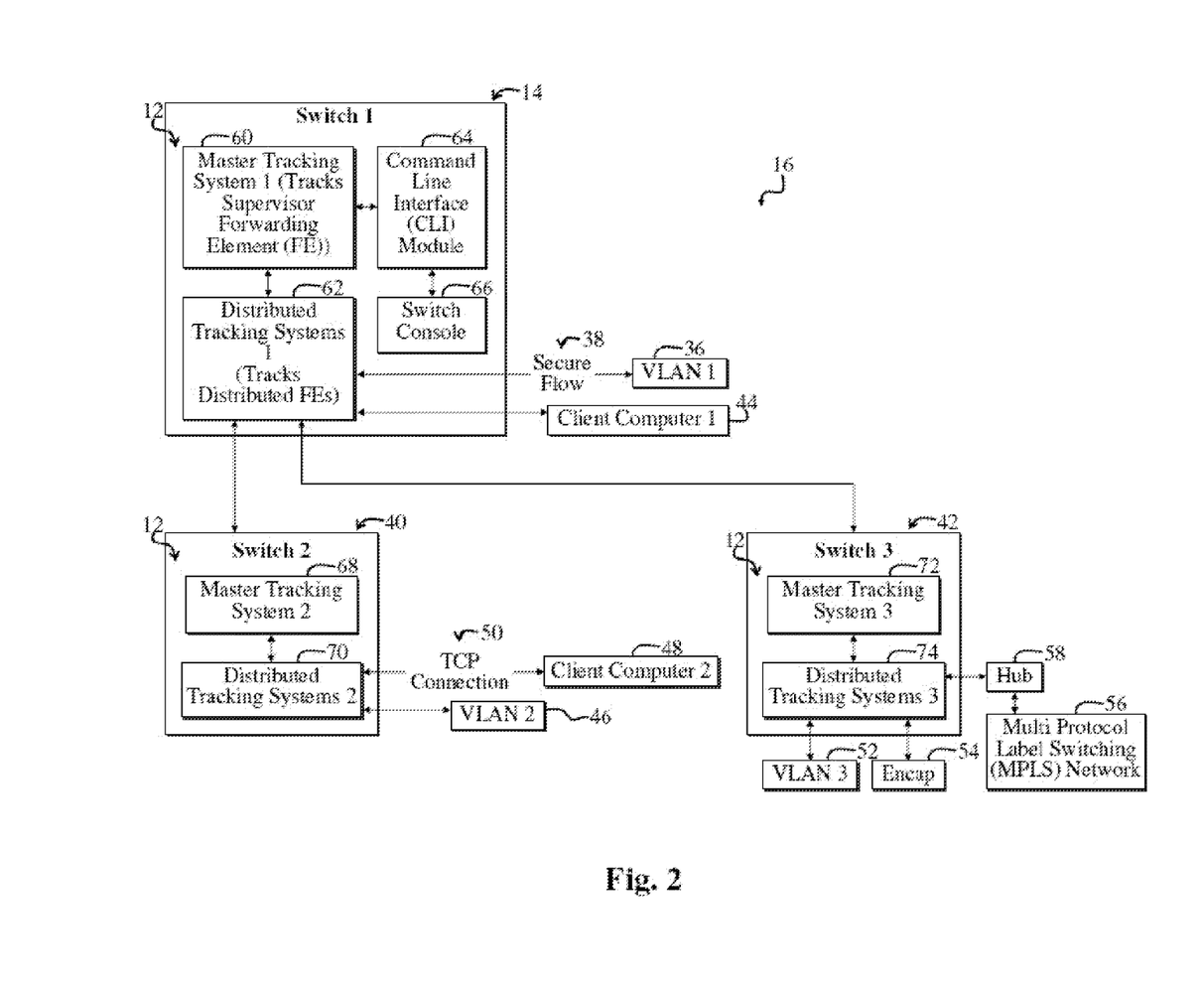
FIG. 2 is a more detailed diagram illustrating exemplary contents of the provider-edge network and accompanying switches that incorporate the resource-tracking system of FIG. 1.

FIG. 2 is a more detailed diagram illustrating exemplary contents of a portion of the first PE network 16 and accompanying switches 14, 40, 42 that incorporate the resource-tracking system 12 of FIG. 1. For illustrative purposes, only certain exemplary components of the PE network 16 are shown. The network 16 is shown including a first switch 14, which communicates with a second switch 40 and a third switch 42. The first switch 14 is connected to the first VLAN 36 and the secure flow 38 between a first client computer 44 and the first switch 14. The second switch 40 is connected to a second VLAN 46 and to a second computer 48 via a Transmission Control Protocol (TCP) connection 50. The third switch 42 is shown connected to a third VLAN 52, an encap 54, and to a Multi Protocol Label Switching (MPLS) network 56 via hub 58.

The resource tracking system 12 is implemented via various modules, including a first master tracking system 60 included in the first switch 14. The first master tracking system 60 may track resources associated with an FE included in a switch supervisor as discussed more fully below.

The first switch 14 further includes various first local-tracking systems 62 that track resources handled by FEs installed on line cards of the switch 14 as discussed more fully below. Resource history that is monitored and tracked by the first local-tracking systems 62 is accessible by the master tracking system 60. The master tracking system 60 also communicates with a CLI system 64, which is user accessible via a switch console 66. The switch console may include a display and/or other user-interface features to facilitate issuing commands or other control signals to the master tracking system 60 as discussed more fully below.

Similarly, the second switch 40 includes a second master tracking system 68, which communicates with second local tracking systems 70. The third switch 42 includes a third master tracking system 72, which communicates with local tracking systems 74.

In operation, the master tracking systems 60, 68, 72 maintain resource evolution information associated with resources pertaining to a supervisor FE in addition to resource evolution information associated with resources that are tracked by the local tracking systems 62, 70, 74. The various tracking systems 60-74 include memories, such as hash tables, to maintain resource information. Accompanying access modules act to detect resource changes and update the hash tables in response thereto. The accompanying access modules also facilitate selective retrieval of resource history information from the hash tables via the switch console 66 and the CLI module 64 as discussed more fully below.

The local tracking systems 62, 70, 74 track various resources, such as MAC addresses associated with the first VLAN 36, the secure flow 38, the first client computer 44, the second VLAN 46, the TCP connection 50, the second computer 48, the third VLAN 52, the encap 54, the hub 58, and the MPLS network 56. When a resource change occurs, the change is registered in one of the local tracking systems 62, 70, 74. The change may then automatically propagate, in accordance with software or hardware instructions running on the accompanying access modules, to other resource tracking systems, including the master tracking systems 60, 68, 72, within the switch 14, 40, 42.

Exact details pertaining to how resource history information propagates between various tracking systems 60-74 are application specific and may be changed or adjusted without departing from the scope of the present invention. For example, a network administrator may employ the switch console 66 and CLI module 64 to issue commands to the various tracking systems 60-74 to change how resource history information is shared by the resource-tracking systems 60-74. Furthermore, changes in resource information may be displayed via the switch console 66 in response to certain CLI commands entered via the switch console 66. Alternatively, resource history information may be fed to a network debugging module or utility (not shown) to facilitate troubleshooting network problems.

The resource tracking system 12, which is implemented via the various resource-tracking components 60-74, may track changes in resources associated with multiple FEs within a single switch and/or may track changes in resources across switches. For example, if the third VLAN 52 is disconnected from the PE network 16, one or more resources, such as connection status and MAC-address assignment status, associated with the third VLAN 52 will change. The change is detected by an FE of the third switch 42. One of the local tracking systems 74 monitoring the FE will log the changes in a hash table or other memory. The change in the resource may then propagate to other hash tables maintained by other resource-tracking systems 60-74 in the network, including the first master tracking system 60.

Figure 3:
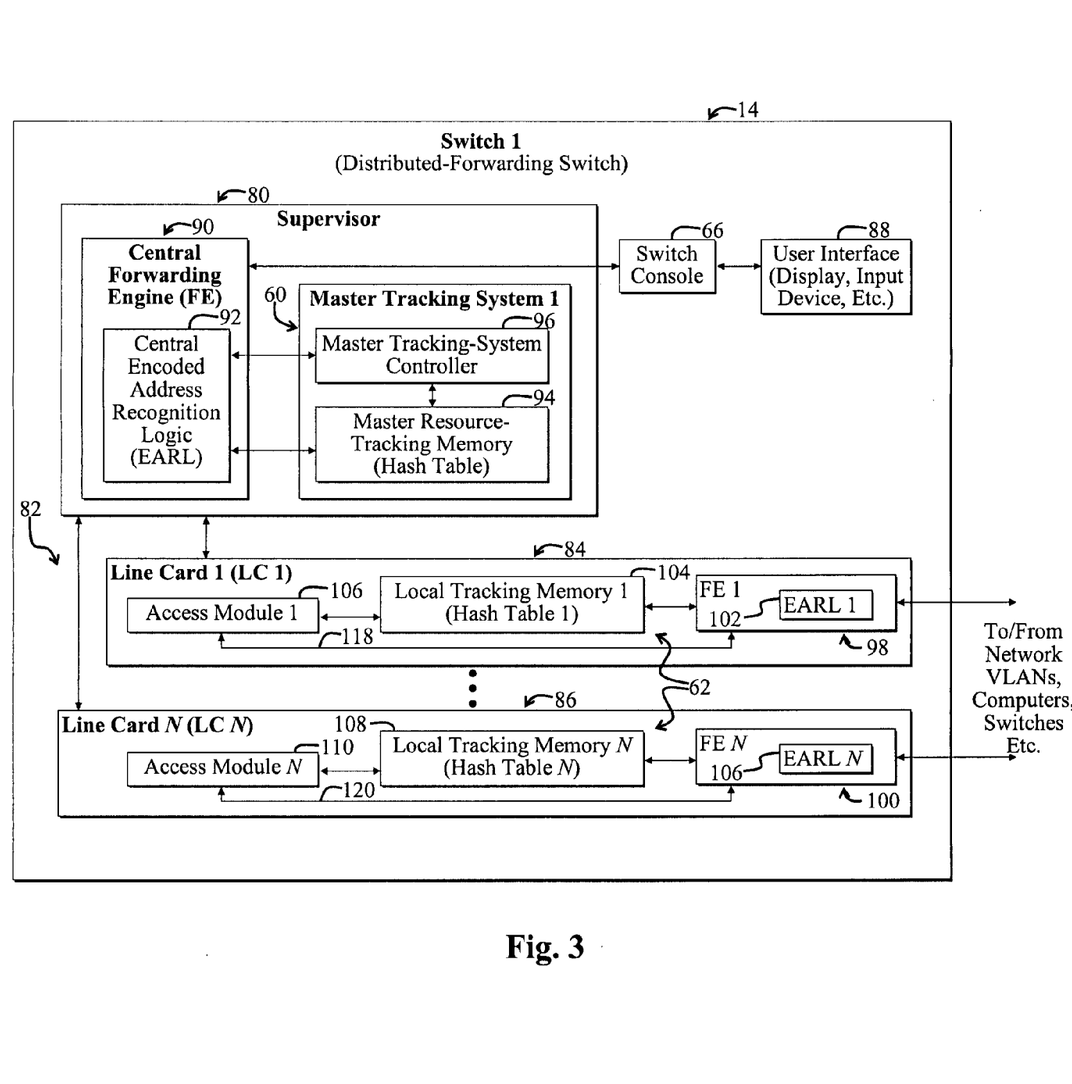
FIG. 3 is a more detailed diagram illustrating exemplary contents of a switch implemented via the networks of FIGS. 1-2.

FIG. 3 is a more detailed diagram illustrating exemplary contents of the first switch 14 of FIG. 2. The second switch 40 and the third switch 42 of the network 16 of FIG. 2 are constructed similarly to the first switch 14 illustrated in FIG. 3.

For illustrative purposes, the first switch 14 is shown including a supervisor 80, which communicates with plural line cards 82, including first line card 84 and an $N^{th}$ line card 86. The supervisor 80 also communicates with the master switch console 66, which employs a user interface 88 to display network resource information. The supervisor 80 is shown including the master tracking system 60 in communication with a supervisor FE 90, which employs EARL 92. The master tracking system 60 includes a master hash table 94 in communication with a master tracking-system controller 96. The master tracking-system controller 96 is responsive to control signals received from the switch console 66 via the user interface 88. For example, control signals issued to the master tracking-system controller 96 may direct the master tracking-system controller 96 to enable tracking on various FEs 90, 98, 100. In addition, the master tracking-system controller 96 may issue additional control signals to the access modules 106, 110 associated with the tracking tables 104, 108 to enable tracking of resources maintained by the FEs 98, 100. The master tracking-system controller 96 may act as an access module for the centralized FE 90 in the supervisor 80.

The various line cards 82 communicate with the supervisor 80, such as via local FEs 98, 100 and the supervisor FE 90. The first line card 84 is shown including a first local FE 98 with an accompanying first EARL module 102. The first line card 84 further includes a first local tracking table 104, which communicates with the first FE 98 and a first local access module 106. Similarly, the $N^{th}$ line card 86 includes an $N^{th}$ FE 100, which includes an accompanying $N^{th}$ EARL 106. The $N^{th}$ line card 86 further includes an $N^{th}$ local tracking table 108, which communicates with the $N^{th}$ FE 100 and an $N^{th}$ access module 110. Each line card 82 may include a dedicated Central Processing Unit (CPU), memory, and other hardware and software to facilitate switching operations. Each of the FEs 98, 100 of the line cards 82 may connect to various network entities, such as the second switch 40, third switch 42, first VLAN 36, and client computer 44 of FIG. 2.

In operation, when various network resources handled by the FEs 90, 98, 100 may change in response to changing network traffic patterns, topologies, security breaches, Denial Of Service (DOS) attacks, and so on. When a resource handled by an FE changes or when a new resource is created, these changes or additions are detected by the tracking-system control module 60 and/or the access modules 106, 110. The access modules 106, 110 update corresponding local tracking tables 104, 108, with the new resource information. The access modules 106, 110 and tracking-system controller 96 then facilitate selectively sharing the new resource information with other local tracking tables 104, 108 and the master hash table 94. Accordingly, the hash table 94 and local tracking tables 104, 108 begin to collect history information, i.e., resource evolution information pertaining to different resources handled by the various FEs 90, 98, 100. The local tracking tables 104, 108 and the hash table 94 may be implemented via hash tables, trees, or other data structures in hardware and/or software without departing from the scope of the present invention.

In FIG. 3, the access modules 106, 110 and local tracking tables 104, 108 are represented collectively as the local tracking systems 62 of the first switch 14 of FIG. 2. The local tracking systems 62 may be implemented in software and/or hardware.

The duration of resource history information maintained by the various local tracking systems 62 and the master tracking system 60 may be adjusted to meet the needs of a given application. History settings may be adjusted by a user via the user interface 88, the switch console 66, and control software or hardware running on the tracking system controller 96. Those skilled in the art with access to the present teachings may readily implement and customize various software and/or hardware modules required to implement embodiments of the present invention without undue experimentation.

Figure 4:
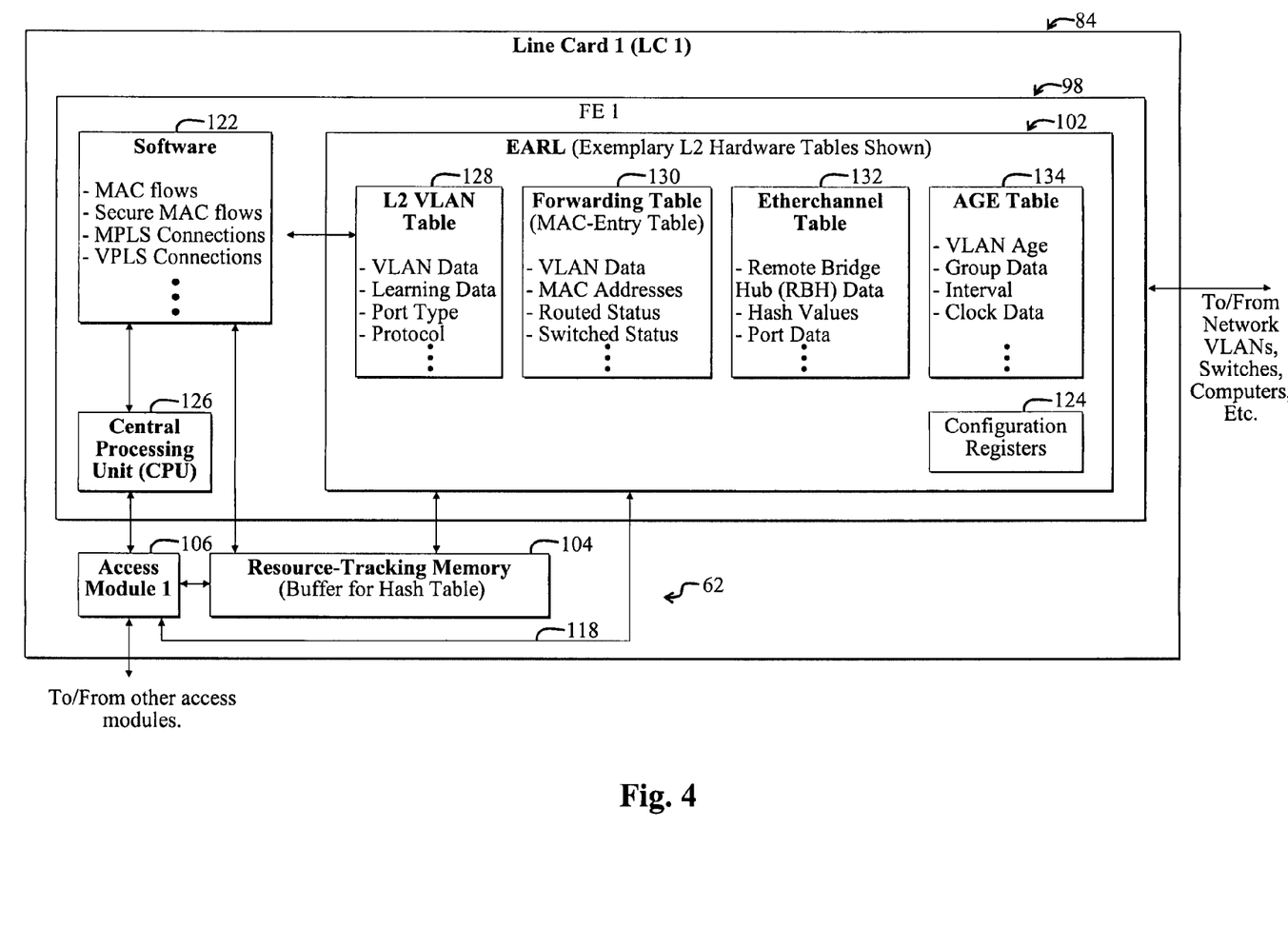
FIG. 4 is a more detailed diagram illustrating exemplary contents of a Line Card (LC) employed by the switch of FIG. 3.

FIG. 4 is a more detailed diagram illustrating exemplary contents of the first LC 84 of FIG. 3. Other LCs, such as the $N^{th}$ LC 86 are constructed similarly to the first LC 84. The first FE 98 is shown including a software table 122, which communicates with various EARL hardware tables 102 and configuration registers 124. The FE software 122 communicates with the resource-tracking access module 106 and accompanying local tracking table 104. In the present specific embodiment, the local tracking table 104 is implemented via a buffer. The access module 106 also communicates with the EARL tables 102. The access module 106 and the FE software 122 employ a Central Processing Unit (CPU) 126 to facilitate software execution.

For illustrative purposes, the EARL hardware tables 102 are shown including various L2 tables, including an L2 VLAN table 128, a MAC-entry forwarding table 130, an Ether channel table 132, and an age table 134. The hardware tables 102 include information pertaining to various network resources. For example, exemplary entries in the L2 table 128 include data pertaining to VLANs, FE learning operations, port types employed, filtering data, protocol data, and so on. Exemplary entries in the forwarding table 130 include VLAN indexes, MAC addresses, routing information, and switching information. Exemplary entries in the Ether channel table 132 include hash data, port data, and Remote Bridge Hub (RBH) data. Exemplary entries in the age table include VLAN age information, Group data, age interval data, clock data, and so on. L3 tables and related resources may also be tracked via embodiments of the present invention without departing from the scope of the present invention.

The FE software 122 may maintain information pertaining to various network resources, such as MAC flows, secure MAC flows, TCP connections, MPLS connections, Virtual Private LAN Service (VPLS) connections, and so on, by selectively referring to the EARL hardware tables 102.

In operation, the access module 106 monitors the FE software 122 and the EARL hardware tables 102 and then adds updated information to the local tracking table 104, which maintains resource history information in a buffer or other memory. For the purposes of the present discussion, the terms resource history information and resource evolution information are employed interchangeably. Resource history information may include a record of how EARL-controlled resources have been initiated and changed. For example, information pertaining to resource creation time, modification time, reason for modification, entity that triggered resource modification, resource sequence, and so on may be tracked via the access module 106 and accompanying resource-tracking table 104. The resource-tracking table 104 and access module may be employed to track any type of resource, including hardware-triggered, software-sourced, protocol-installed, and user-installed resources, whether the resources are L2, L3, or other types of resources.

The access module 106 may facilitate propagating the resource history information maintained in the local resource-tracking table 104 to other resource-tracking tables, such as the master tracking table 96 of FIG. 3.

Hence, with reference to FIGS. 1-4, the resource-tracking system 12 acts as a system for tracking resources in a network 10, wherein the system includes distributed tracking modules 60-74, included in plural distributed entities, such as supervisors 80 and line cards 82, which are connected to the network 10. A centralized tracking module, such as the master tracking module 60, is included in a centralized entity, such as the supervisor 80, that communicates with the distributed entities. A user interface, such as the switch console 66 and interface 88, communicate with the centralized tracking module 60.

For the purposes of the present discussion, a tracking module may be any hardware and/or software entity that can retrieve and/or maintain history information pertaining to a network resource.

The centralized tracking module 60 includes a first mechanism, such as the resource-tracking hash table 94, for selectively aggregating information from the distributed tracking modules 60-74, wherein the information includes resource history. The resource history may include information pertaining to changes in layer-2 (L2) resources, such as resource creation time, reason for creation of certain resources, and information pertaining to what triggered each of the changes in the L2 resource.

Alternatively, the resource tracking system 12 may be considered a system for tracking resource usage in a switch, such as the distributed forwarding switch 14. In this embodiment, the system 12 comprises a memory, such as the master resource-tracking hash table 94 and/or local tracking tables 104, 108. In this embodiment, the distributed-forwarding switch 14 maintains resource evolution information. A module, such as the master tracking-system controller 96 and/or access modules 106, 110, communicate with the memory 94, 104, 108. The module 96, 106, 110 is adapted to update the resource evolution information maintained by the memory 94, 104, 108 when the resource changes or information associated with the resource changes. The resource tracking system 12 may include plural modules 94, 104, 108 that implement hardware and/or software routines to selectively propagate changes in resources associated with one FE 90, 98, 100 to other FEs 90, 98, 100 in the network 10. A display connected to master tracking-system controller 96 may be employed to selectively aggregate and display the resource evolution information from plural resource-tracking modules 94, 104, 108 in the network 10.

Alternatively, the system 12 may be considered a system for facilitating maintaining history information pertaining to network resources or parameters maintained by a switch, such as one or more of the switches 14, 40, 42 of FIG. 2-3. In this case, the system 12 may be considered including a first mechanism 94, 104, 108 for storing history information pertaining to a network resource. A second mechanism 96, 106, 110, 102, 106 determines when the network resource changes and provides a signal in response thereto. For example, the signal may correspond to one of the signals 116, 118, 120 between the FEs 90, 98, 100 and the access modules 96, 106, 110 of FIG. 3, in response thereto. A third mechanism, such as the access modules 96, 106, 110 selectively update the history information in response to the signal 116, 118, 120.

The system 12 may further include a fourth mechanism 66, 88, 96 for enabling user access to the first mechanism 94, 104, 108. One or more of the switches 14, 40, 42 may be implemented via routers without departing from the scope of the present invention. The first mechanism 94, 104, 108 may further include a centralized module, such as the master hash table 94, for storing the history information. The centralized module 94 may be associated with a centralized FE, such as the FE 90 of FIG. 3.

A fifth mechanism 96, 106, 110 may implement routines for selectively distributing changes associated with resources tracked by a local resource-tracking module 62, 70, 74 associated with a local FE 98, 100 to plural other local resource-tracking modules 62, 70, 74 associated with different FEs 90, 98, 100. The FEs 90, 98, 100 may be positioned in similar or different switches. One or more distributed resource-tracking tables 104, 108 may maintain resource information associated with distributed FEs 98, 100. A centralized FE 90 and the distributed FEs 98, 100 may include EARL 92, 102, 106.

The centralized module 60 may be a master resource-tracking storage module 60, such as the master tracking module 60 of FIG. 3, which communicates with resource-tracking control software or hardware 96. The resource-tracking control software or hardware 96 communicates with a resource-tracking table 94, which may be implemented via a hash table, buffer, or other memory. Resource-tracking control software or hardware 96 is configurable via the fourth mechanism 66, 88, 96.

The resource-tracking control software 96 implements one or more routines to enable selective retrieval of resource information via the fourth mechanism 66, 88, 96 from one or more FEs 90, 98, 100 existing on one or more different switches, such as the switches 40, 42, which are separate from the switch 14 that maintains the resource-tracking control software 96. Examples of resource information tracked by the resource-tracking system 12 include information that specifies associated resource creation time, modification time, reason for modification, and/or the event that triggered resource modification.

Alternatively, the system 12 may be considered a system for tracking resource usage in a switch, wherein the system includes a first mechanism 60, 62 for enabling resource tracking for a centralized EARL module 90 located in a first switch 14. A second mechanism 62 for enables resource tracking in multiple distributed EARL modules 102, 106 in the first switch 14. A third mechanism 68-74 enables resource tracking for one or more different switches 40, 42 that communicate with the first switch 14. A fourth mechanism 96, 66, 88 facilitates selectively activating the first mechanism 60, 62, the second mechanism 62, and/the third mechanism 68-74 based on user input.

Figure 5:
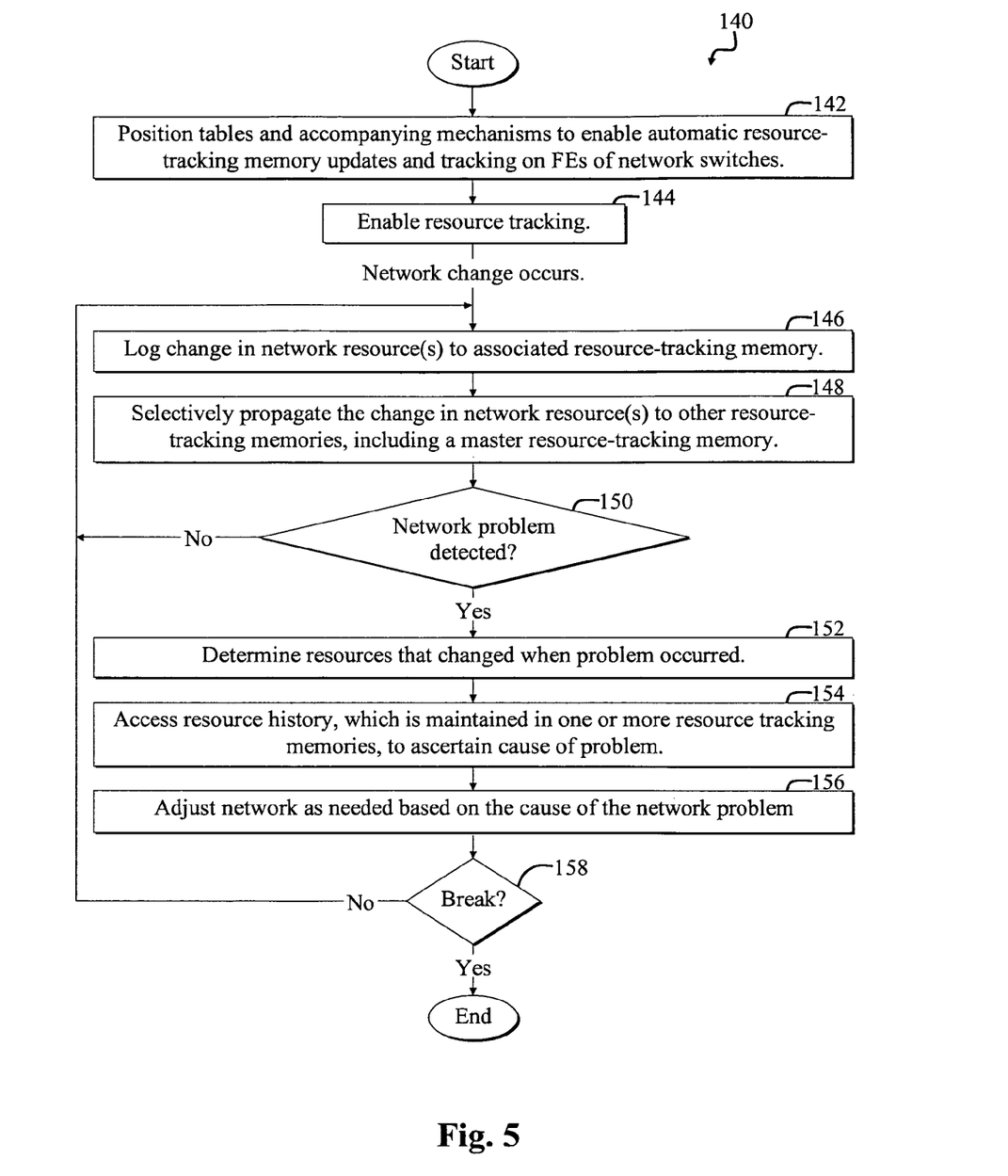
FIG. 5 is a flow diagram of a method adapted for use with the resource-tracking system and network of FIGS. 1-4.

FIG. 5 is a flow diagram of a method 140 adapted for use with the resource-tracking system 12, 60-74 and network 10 of FIGS. 1-3. The method 140 includes an initial feature-inclusion step 142, wherein various resource-tracking tables and accompanying table-access software and/or hardware are positioned in various locations in one or more distributed-forwarding switches of a network, such as the network 10 of FIG. 1. The resource-tracking tables or other memory devices and accompanying access hardware or software are installed in a switch so as to enable tracking of resources used by switch components, such as distributed FEs and a centralized FE.

Subsequently, resource tracking is enabled in a resource-tracking step 144. After resource tracking is enabled, such as via a master resource-tracking controller, any changes in resources will be logged in the resource tracking tables in a logging step 146.

After certain changes in resources are logged, a resource-history-propagating step 148 is performed. The resource-history-propagating step 148 includes selectively propagating information pertaining to changes in resources, which were detected in the logging step 146, to other resource-tracking tables in a given switch and/or in different switches, depending on the configuration of the resource-tracking tables and accompanying access modules.

In certain implementations, changes in or updates to resource history information are only propagated to one or more master tracking-tables in a given switch and not necessarily to other distributed tracking-tables. Exact details as to how resource information should be propagated are application specific and may be readily determined by those skilled in the art with access to the present teachings without undue experimentation.

A subsequent problem-detecting step 150 involves detecting when a network problem occurs. If a network problem has not occurred, then the logging step 146 continues. Otherwise, a problem-determining step 152 is performed.

The problem-determining step 152 includes determining which resources changed when a problem was detected or during an interval around when a problem was detected.

Subsequently, a resource-history-accessing step 154 is performed. The resource-history-accessing step 154 includes accessing resource history information pertaining to the resources that changed when a problem was detected.

After resource-history information is accessed in the resource-history-accessing step 154, the network may then be adjusted, in a network-adjusting step 156, as needed based on a determined cause of the detected network problem as may be apparent from the resource-history information.

Subsequently, a system-break-checking step 158 determines whether a system break has occurred. A system break may occur when the associated resource-tracking system is disabled. If a system break occurs, the method 140 completes. Otherwise, the logging step 146 continues.

Steps 150-156 may be implemented via a network debugger in communication with one or more resource-tracking tables, such as the master tracking table 96 of FIG. 3.

Various steps 142-158 of the method 140 may be omitted, interchanged, or replaced with other steps without departing from the scope of the present invention. For example, 150-158 may be omitted in embodiments where network debugging is not required or desired.

With reference to FIGS. 1-5, while the present embodiments have been discussed with reference to distributed forwarding switches, embodiments of the present invention may work with other types of switches to facilitate resource tracking without departing from the scope of the present invention.

When a network problem occurs, such as when a secure connection breaks, existing networks often lack efficient mechanisms for determining what caused the problem. For example, existing networks lack mechanisms for maintaining history information pertaining to network resources, such as L2 resources. Furthermore, conventional systems and methods for monitoring network behavior are typically inapplicable to switches employing distributed FEs, including switches employing EARL, such as Cisco Catalyst 6K (where K may be 500, 509, etc.) switches. Furthermore, such conventional systems typically lack ability to track distributed resources.

Currently, little or no information is maintained about changes occurring in switch resources, including addresses maintained in address tables, such as how the changes where triggered, for what purpose, when the changes occurred, and so on. Consequently, solving switch operation and network operation problems is often problematic. Technicians may lack requisite information to troubleshoot and understand a given network topology and associated traffic requirements. Furthermore, integration of resource-sharing functionality is problematic when information pertaining to how certain resources are being used in the network is not available.

Knowledge of how resources, such as a MAC address, VLAN, or VLAN/MAC-address pair, have changed may facilitate troubleshooting problems pertaining to distributed forwarded, distributed learning, distributed Etherchannels, and related L2 features, such as unicast protection, MAC-address limiting, and per VLAN learning and aging.

Accordingly, embodiments of the present invention provide knowledge of how resources are changing and have changed within distributed FEs and across switches with distributed FEs. This knowledge is readily employable to facilitate trouble shooting network operation, including Layer-2 device performance.

Embodiments of the present invention are particularly useful for tracking resource changes that are local to a given FE in a switch that affect other modules in the same switch. Furthermore, certain embodiments of the present invention may facilitate integration of resource-sharing features by facilitating determining how exactly resources are being used across multiple FEs within a switch.

Certain embodiments of the present invention may be employed to facilitate troubleshooting switches deployed in various types of networks, including core, metro, and service provider networks.

Examples of events and resources that embodiments of the present invention may track include but are not limited to:

Hardware operations to a given L2 resource, such as dynamic learn of MAC address entry, changes to values of some fields in the hardware tables.

Software operations to a given L2 resource, such as MAC address entry values such as insert, purge, and modify values.

L2 resource hardware state. For example, a MAC entry in an L2 table may be monitored by an access module via a continuous search to see when the MAC entry gets added, purged, and/or modified.

Trackable events that affect a MAC-address entry in a switch, such as a Cisco Catalyst 6K system include but are not limited to:

Dynamic addition of MAC-address entry through distributed learning.

Static addition or purging of MAC address entry through a router.

Static addition or purging of MAC address entry through routing protocols (OSPF).

L2 aging of a dynamic entry.

Routed MAC (RM) aging of an RM entry.

Etherchannel aging of MAC entries on all Etherchannels.

Purging of MAC entries during Etherchannel aging.

Change in the attributes of a MAC entries (such as RM, PI_E . . . ) due to distributed forwarding.

MAC move resulting in a change in index of a MAC-address entry.

Purging of a MAC-address entry due to MAC-limiting.

Internetworking Operating System (IOS) Command Line Interface (CLI) triggered changes to MAC-address entries, such as removal of entry, changing attributes of an entry, adding entry, and soon.

Port security associated with installing or purging a static entry.

Multicast protocols associated with installing or purging a static entry through software.

Static addition or purging of a MAC-address entry through various protocols.

Additional examples of resources that may be tracked by embodiments of the present invention are provided in co-pending U.S. patent application Ser. No. 11/043,551 entitled METHOD AND APPARATUS FOR TRACKING LAYER-2 (L2) RESOURCE OF A SWITCH, which is herein incorporated by reference.

While examples of certain resources are discussed herein, embodiments of the present invention are not limited thereto. For example, various other types of resources, such as L3 resources, may be via embodiments of the present invention without departing from the scope thereof.

Certain embodiments of the present invention are particularly useful in distributed-forwarding switches, such as Cisco, Juniper, Foundry, and/or Extreme distributed-forwarding switches. In distributed-switching applications, interfaces or line modules on L3 switches handle forwarding decisions independently. With distributed switching, a centralized switching engine synchronizes L3 forwarding, routing, and rewrite tables to local tables on distributed switching-capable modules. Consequently, individual line cards or ports make forwarding decisions without the aid of the centralized switching engine; frames pass between ports directly across a fabric. System performance with distributed switching depends on the performance of all FEs.

Various embodiments of the invention may be implemented via hardware and/or software. Software modules may readily be implemented to run on an Internetworking Operating System (IOS) without undue experimentation by those skilled in the art.

Certain embodiments of the present invention are particularly useful for security purposes. For example, network security features may be developed that employ embodiments of the present invention to track the use and evolution of a resource in the distributed-forwarding switch and across switches in the customer network to readily diagnose the nature of an attack or security breech.

Although embodiments of the invention are discussed primarily with respect to server-client architecture, any acceptable architecture, topology, protocols, or other network and digital processing features can be employed. In general, network controllers, managers, access points, endpoints, clients, and so on, can be implemented via any device with processing ability or other requisite functionality.

Although processes of the present invention and the hardware executing the processes may be characterized by language common to a discussion of the Internet (e.g., "client," "server," "peer"), it should be apparent that operations of the present invention can execute on any type of suitable hardware in any communication relationship to another device on any type of link or network.

Although a process of the present invention may be presented as a single entity, such as software executing on a single machine, such software can readily be executed on multiple machines. That is, there may be multiple instances of a given software program, a single program may be executing on two or more processors in a distributed processing environment, parts of a single program may be executing on different physical machines, etc. Furthermore, two different programs, such as a client and server program, can be executing in a single machine, or in different machines. A single program can be operating as a client for one information transaction and as a server for a different information transaction.

Any type of processing device can be used as a client. For example, portable computing devices such as a personal digital assistant (PDA), cell phone, laptop computer, or other devices can be employed. In general, the devices and manner of specific processing (including location and timing) are not critical to practicing important features of the present invention.

Although the invention has been discussed with respect to specific embodiments thereof, these embodiments are merely illustrative, and not restrictive, of the invention. Embodiments of the present invention can operate between any two processes or entities including users, devices, functional systems, or combinations of hardware and software. Peer-to-peer networks and any other networks or systems where the roles of client and server are switched, change dynamically, or are not even present are within the scope of the invention.

Any suitable programming language can be used to implement the routines or other instructions employed by various network entities. Exemplary programming languages include C, C++, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium that can contain and store the program for use by or in connection with the instruction execution system, apparatus, system or device. The computer readable medium can be, by way of example only but not by limitation a semiconductor system, apparatus, system, device, or computer memory.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented in whole or in part by using a programmed general purpose digital computer; by using application specific integrated circuits, programmable logic devices, field programmable gate arrays, optical, chemical, biological, quantum or nanoengineered systems or mechanisms; and so on. In general, the functions of the present invention can be achieved by any means as is known in the art. Distributed or networked systems, components, and/or circuits can be used. Communication, or transfer of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A system comprising:
    a switch structured and arranged to selectively filter and forward network traffic, the switch including:
        distributed tracking modules included in a plurality of line cards of the switch, wherein each distributed tracking module is associated with a distinct line card and includes a distributed tracking table comprising a local hash table, wherein each distributed tracking module monitors for an existence of changes in network resources associated with a distributed forwarding engine (FE) in the respective line card and triggers storage of resource history information for each change in respective distributed tracking table, and wherein each distributed tracking module distributes resource history information associated with a change in an associated network resource to other distributed tracking modules and a centralized tracking module;
        the centralized tracking module included in a supervisory module of the switch that communicates with the distributed tracking modules in the plurality of line cards of the switch and with a centralized FE associated with the centralized tracking module, wherein the centralized tracking module stores resource history information in a centralized tracking table comprising a master hash table located at the centralized tracking module, wherein the master hash table aggregates the resource history information from the local hash tables of the distributed tracking modules, and wherein the resource history information in each local hash table and the master hash table are updated based upon detection of resource changes or information associated with the resource changes; and
        a user interface in communication with the centralized tracking module,
        wherein resource history information for a network resource includes a resource creation time for the network resource, a reason for creation for the network resource and a mechanism that triggered change in the network resource.

2. The system of claim 1 wherein the centralized tracking module includes a first mechanism for selectively aggregating the resource history information from the distributed tracking modules.

3. The system of claim 1 wherein a network resource is one or more of a network entity, characteristic, and associated identifier.

4. The system of claim 1 wherein the system is implemented in one or more switches, wherein the one or more switches include one or more distributed forwarding engines.

5. The system of claim 4 wherein the one or more distributed forwarding engines implements encoded address recognition logic (EARL).

6. The system of claim 1 wherein the user interface includes a display on a switch console that is coupled to the switch.

7. The system of claim 1, wherein the system triggers the storage of the resource history information for each change of a network resource.

8. The system of claim 1, wherein the network resources include International Standards Organization (ISO) Open Systems Interconnection (OSI) Layer-2 (L2) network resources.

9. The system of claim 1, wherein the resource history information for a network resource includes aging information for the network resource and changes to hardware and software.

10. A system comprising:
    a switch structured and arranged to selectively filter and forward network traffic, the switch including a plurality of line cards;
    a distributed tracking module in a line card of the switch for tracking one or more network resources associated with a distributed forwarding engine (FE) in the respective line card and for updating resource history information associated with a network resource when the network resource changes or information associated with network resource changes, and wherein the distributed tracking module distributes the resource history information to other distributed tracking modules and a centralized tracking module, and
    wherein resource history information for a network resource includes a resource creation time for the network resource, a reason for creation for the network resource and a mechanism that triggered change in the network resource;
    a memory included in each line card and in communication with the distributed tracking module in the respective line card, wherein the memory maintains the resource history information in one or more distributed tracking tables that are associated with the distributed tracking module in the respective line card, and wherein a distributed tracking table comprises a local hash table;
    the centralized tracking module included in a supervisory module of the switch wherein the centralized tracking module communicates with the distributed tracking modules in the plurality of line cards and a centralized FE associated with the centralized tracking module, the centralized tracking module aggregating the resource history information from local hash tables located at distributed tracking modules and storing the aggregated resource history information in a centralized tracking table comprising a master hash table included in the centralized tracking module; and
    a user interface in communication with the centralized tracking module through a switch console, wherein the centralized tracking module is responsive to control signals originating from the user interface.

11. The system of claim 10, wherein the centralized forwarding engine is in communication with plural distributed forwarding engines, wherein each line card of the switch includes a distributed forwarding engine associated with the distributed tracking module in the line card.

12. The system of claim 11 wherein the forwarding engines include encoded address recognition logic (EARL).

13. The system of claim 11, wherein the centralized tracking module includes a memory in communication with the centralized forwarding engine, the memory storing the aggregated resource history information in the master hash table included in the memory.

14. The system of claim 13 further including additional centralized tracking modules and distributed forwarding engines located on different distributed-forwarding switches.

15. The system of claim 14 wherein each of the centralized tracking modules and distributed tracking modules include routines that log changes in network resources associated with accompanying forwarding engines.

16. The system of claim 15, wherein the distributed tracking module in a line card includes additional routines that selectively propagate changes in network resources associated with the forwarding engine in the line card to other forwarding engines in other line cards in the switch.

17. The system of claim 15 further including enabling the user interface to be in communication with centralized resource tracking modules and distributed resource tracking modules, wherein the user interface selectively aggregates and displays resource history information from one or more centralized tracking modules and distributed tracking modules in the switch.

18. The system of claim 10, wherein the system triggers the update of the resource history information for each change of a network resource.

19. The system of claim 10, wherein the network resources include International Standards Organization (ISO) Open Systems Interconnection (OSI) Layer-2 (L2) network resources.

20. The system of claim 10, wherein the resource history information for a network resource includes aging information for the network resource and changes to hardware and software.

21. The system of claim 10, wherein the resource history information is selectively forwarded to the user interface and displayed in response to queries or control signals originating from the user interface.

22. A method comprising:
positioning, in a first switch in a network, a centralized tracking table in a centralized tracking module of the first switch, wherein the centralized tracking table is in communication with a centralized forwarding engine (FE) in the first switch, wherein positioning the centralized tracking table includes creating the centralized tracking table and enabling the centralized tracking table to store resource history information;
positioning a first distributed tracking table in a first line card in the first switch such that the first distributed tracking table is in communication with a first distributed tracking module and a first distributed FE in the first line card, and a second distributed tracking table in a second line card in the first switch such that the second distributed tracking table is in communication with a second distributed tracking module and a second distributed FE in the second line card;
enabling tracking of network resources by the centralized tracking module of the first switch and the distributed tracking modules in the first line card and the second line card such that the centralized tracking module and the distributed tracking modules are aware of a state of network resources associated with the centralized FE and the distributed FEs and any change in the network resources;
based upon a change in a first network resource associated with the first distributed FE, logging, using the first distributed tracking module, the change in the first network resource, wherein logging the change in the first network resource includes storing resource history information associated with the change in the first network resource in the first distributed tracking table, wherein the first distributed tracking table is a local hash table included in the first distributed tracking module;
distributing, using the first distributed tracking module, resource history information associated with the change in the first network resource to the centralized tracking module and the second distributed tracking module;
based upon receiving the resource history information associated with the change in the first network resource from the first distributed tracking module, storing the resource history information associated with the change in the first network resource in the centralized tracking table using the centralized tracking module and in the second distributed tracking table using second distributed tracking module, wherein the centralized tracking table is a master hash table located at the centralized tracking module and the second distributed tracking table is a local hash table included in the second distributed tracking module, wherein resource history information for a network resource includes a resource creation time for the network resource, a reason for creation for the network resource and a mechanism that triggered change in the network resource;
detecting, using a network debugger included in the network, an occurrence of a network problem, wherein the network debugger is a network device configured to detect network problems and is in communication with the centralized tracking module, the first distributed tracking module and the second distributed tracking module in the first switch;
determining, using the network debugger, network resources that changed in a time interval that includes a time of detection of the network problem;
based upon determining that the first network resource changed in the time interval that includes the time of detection of the network problem, accessing, using the network debugger, the resource history information associated with the first network resource, wherein accessing the resource history information associated with the first network resource includes accessing the resource history information associated with the first network resource from the centralized tracking table;
determining, using the network debugger, a cause for the network problem by analyzing the resource history information associated with the first network resource; and
adjusting, using the network debugger, the network based upon determining the cause for the network problem.

23. The method of claim 22, wherein distributing, using the first distributed tracking module, resource history information associated with the change in the first network resource further includes distributing, using the first distributed tracking module, resource history information associated with the change in the first network resource to a second switch in the network.

24. The method of claim 22, wherein storing resource history information associated with the change in the first network resource in the first distributed tracking table further includes updating resource history information associated with the change in the first network resource in the first distributed tracking table.

25. The method of claim 22, wherein storing resource history information associated with the change in the first network resource in the centralized tracking table further includes updating resource history information associated with the change in the first network resource in the centralized tracking table.

26. The method of claim 22, wherein accessing, using the network debugger, the resource history information associated with the first network resource further includes accessing, using the network debugger, the resource history information associated with the first network resource from the first distributed tracking table.

27. The method of claim 22, wherein adjusting, using the network debugger, the network further includes troubleshooting the first switch.

* * * * *